(12) United States Patent
Noritake

(10) Patent No.: US 6,672,915 B2
(45) Date of Patent: Jan. 6, 2004

(54) CONNECTOR FOR MOTOR

(75) Inventor: Seiichiro Noritake, Nagano (JP)

(73) Assignee: Kabushiki Kaisha Sankyo Seiki Seisakusho, Nagano (JP)

( * ) Notice: Subject to any disclaimer, the term of this patent is extended or adjusted under 35 U.S.C. 154(b) by 0 days.

(21) Appl. No.: 10/157,817

(22) Filed: May 31, 2002

(65) Prior Publication Data
US 2002/0182944 A1 Dec. 5, 2002

(30) Foreign Application Priority Data

Jun. 1, 2001 (JP) ..................... P2001-167388

(51) Int. Cl.[7] ................................. H01R 9/24
(52) U.S. Cl. ...................................... 439/884
(58) Field of Search ........................ 439/884, 224, 439/856, 857, 858, 861

(56) References Cited

U.S. PATENT DOCUMENTS

| | | | | |
|---|---|---|---|---|
| 4,118,103 A | * | 10/1978 | Leidy et al. | 439/398 |
| 4,557,544 A | * | 12/1985 | Esser | 439/391 |
| 5,204,565 A | * | 4/1993 | Sekine et al. | 310/71 |
| 6,276,969 B1 | * | 8/2001 | Unno et al. | 439/621 |
| 6,296,513 B1 | * | 10/2001 | Ishikawa et al. | 439/403 |

* cited by examiner

*Primary Examiner*—Tulsidas Patel
(74) *Attorney, Agent, or Firm*—Sughrue Mion, PLLC

(57) ABSTRACT

A connector is connected to a terminal of a coil wound on a motor bobbin in a motor, and coupled with a mating connector to electrically connect the motor and an external device. In the connector, at least one conductive connection member is accommodated in an insulative holder. The connection member includes a main body, a first engagement section monolithically formed on a first end portion of the main body to elastically hold the terminal of the coil, and a second engagement section monolithically formed on a second end portion of the main body to be coupled with the mating connector.

17 Claims, 4 Drawing Sheets

CONNECTOR FOR MOTOR

BACKGROUND OF THE INVENTION

The present invention relates to a connector designed for coupling an external-device with a motor, as well as to a motor incorporating the connector.

In relation to a motor, an end of a drive coil (i.e., a winding) wound around a motor bobbin is generally soldered to a coil terminal assuming the shape of a pin. Likewise, the coil terminal is connected to a substrate by soldering. A vinyl line extending from the substrate is routed to an external device, such as a controller. A connector is provided at a terminal of the vinyl line extending from the motor. The motor connector is fitted to a mating connector, whereby an external device is electrically connected to the coil terminal of the motor.

However, such a commonly-used motor connector uses numerous parts, such as those mentioned above, making parts control and productivity unsatisfactory. Further, large-scale use of solder deteriorates the working environment.

SUMMARY OF THE INVENTION

Accordingly, the invention aims at providing a motor connector designed so as to enable inexpensive and superior connection of connectors by use of a simple structure, as well as providing a motor incorporating the motor connector.

In order to achieve the above object, according to the present invention, there is provided a connector connected to a terminal of a coil wound on a motor bobbin in a motor, and coupled with a mating connector to electrically connect the motor and an external device, the connector comprising:

an insulative holder; and
at least one conductive connection member, accommodated in the holder, the connection member includes:
 a main body;
 a first engagement section, monolithically formed on a first end portion of the main body to hold the terminal of the coil; and
 a second engagement section, monolithically formed on a second end portion of the main body to be coupled with the mating connector.

Preferably, the first engagement section elastically holds the terminal of the coil.

In this configuration, the coil terminal is connected directly to the connection member without involvement of any other member. Hence, a connecting operation is performed efficiently by use of a minimum component constitution.

Preferably, the main body of the connection member extends in a first direction which is parallel with a rotary shaft of the motor. Here, the mating connector is attached to the second engagement section in the first direction. The terminal of the coil is attached to the first engagement section in a second direction which is perpendicular to the first direction.

In this configuration, it is prevented load from directly exerting to any connection portion between the first engagement section and the coil terminal when the mating connector is attached to the second engagement section.

Preferably, the connection member is formed from a single conductive plate including a pair of main body pieces extended from a connecting portion in a cantilevered manner to form the main body. Here, the second engagement section is extended from one end portion of the connecting portion. The connection member is formed by folding the connecting portion such that the main body pieces are opposed with each other while defining a gap therebetween.

In this configuration, it is efficiently improved rigidity of the connector by a connection member of compact geometry.

Here, it is preferable that an engagement piece is extended from a free end portion of each main body piece in a direction perpendicular to a direction in which the main body piece extends. The engagement pieces are opposed with each other when the connecting portion is folded to define a gap therebetween. The terminal of the coil is inserted into the gap between the engagement pieces so that the engagement pieces serve as the first engagement section.

In this configuration, the first engagement section is efficiently formed by utilization of the geometry of a folded portion of the main body. Hence, productivity of the connector can be further improved.

According to the present invention, there is also provided a motor, comprising:

a casing body;
a motor bobbin accommodated in the casing body;
a coil wound on the motor bobbin;
a connector provided with at least one conductive connection member including:
 a main body;
 a first engagement section, monolithically formed on a first end portion of the main body to elastically hold a terminal of the coil; and
 a second engagement section, monolithically formed on a second end portion of the main body to be coupled with a mating connector to which an external device is connected.

Preferably, the first engagement section elastically holds the terminal of the coil.

Preferably, the connector includes an insulative holder for accommodating the connection member therein. Here, the holder is integrally fitted with the casing body to form a part of the casing body.

In this configuration, the connector and the motor can be handled in an integrated fashion.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

There will now be described one embodiment in which a motor connector according to the invention and a motor incorporating the motor connector are applied to a damper device to be used in a refrigerator.

Figure 4:
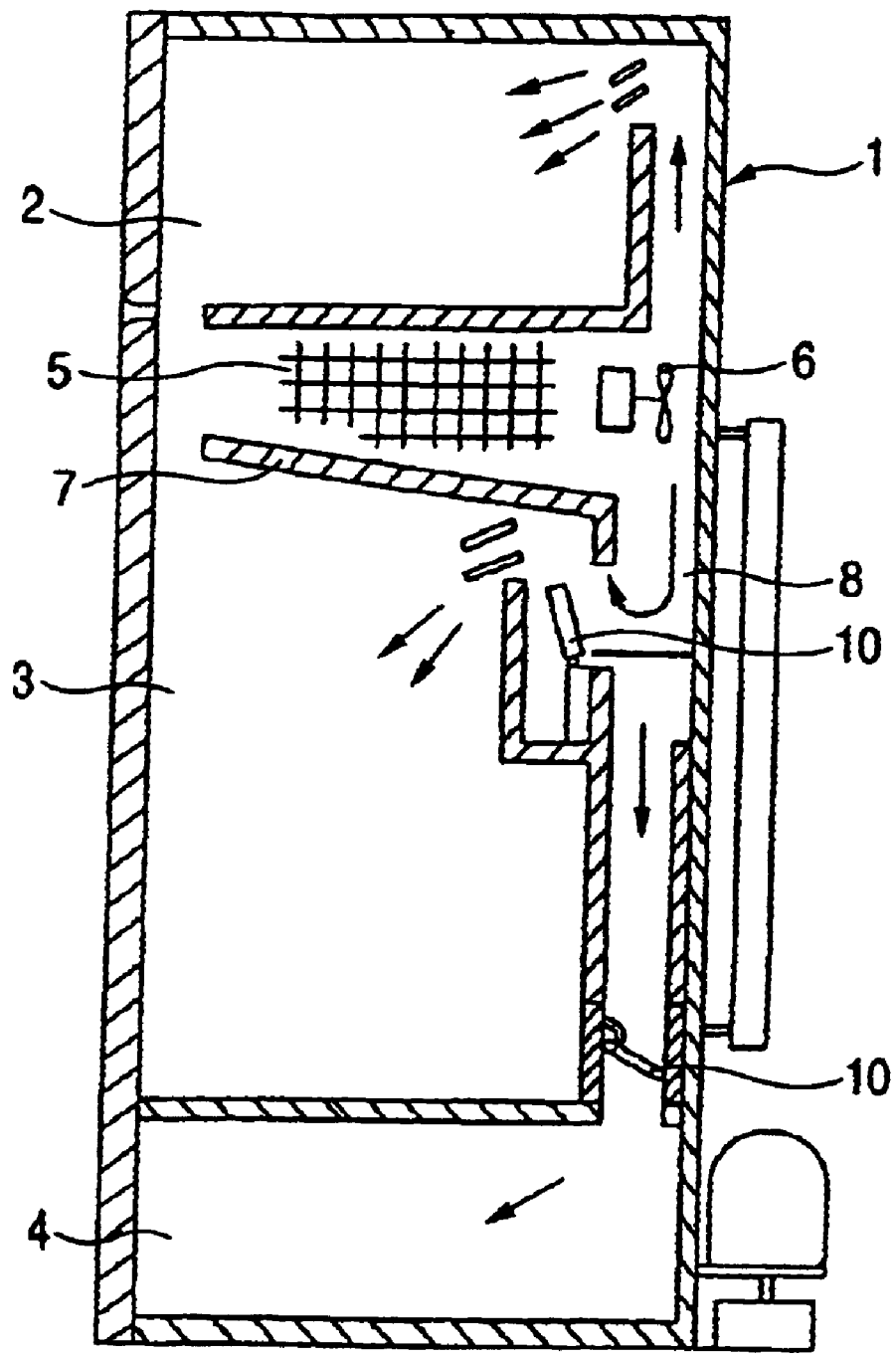
FIG. 4 is a longitudinal cross-sectional view of a refrigerator using the motor-type damper shown in FIGS. 2 and 3.

A refrigerator 1 which is shown in FIG. 4 is divided into a freezer compartment 2; a refrigerator compartment 3; and a crisper drawer 4. An evaporator 5 is disposed in the bottom of the freezer compartment 2. A fan motor 6 is provided in the rear of the evaporator 5 and blows and circulates produced cold air to the freezer compartment 2, the refrigerator compartment 3, and the crisper drawer 4 as indicated by arrows. A partition panel 7 is interposed between the evaporator 5 and the refrigerator compartment 3, thereby preventing the cold air produced by the evaporator 5 directly from flowing into the refrigerator compartment 3.

A ventilation path 8 for cold air is defined between the rear of the partition plate 7 and an inner rear wall of the refrigerator 1. A motor-type damper 10 is fitted into a portion of the ventilation path 8 which is communicated with the crisper drawer 4. More specifically, the damper 10 is fitted so as to constitute a portion of the ventilation path 8. In other words, the damper 10 serves as a part of the ventilation path 8. Another motor-type damper 10 is also provided in the back of the refrigeration compartment 3. In the embodiment, two motor-type dampers 10 are thus provided. It may be the case that the dampers 10 are disposed not in both the refrigerator compartment 3 and the crisper drawer 4, but in only one of these. Alternatively, in addition to these dampers 10, another motor-type damper 10 may be provided for the freezer compartment 2. Further alternatively, the motor-type dampers 10 may be attached to all the compartments.

The structure of a drive section provided in the motor-type damper 10 will now be described.

Figure 2:
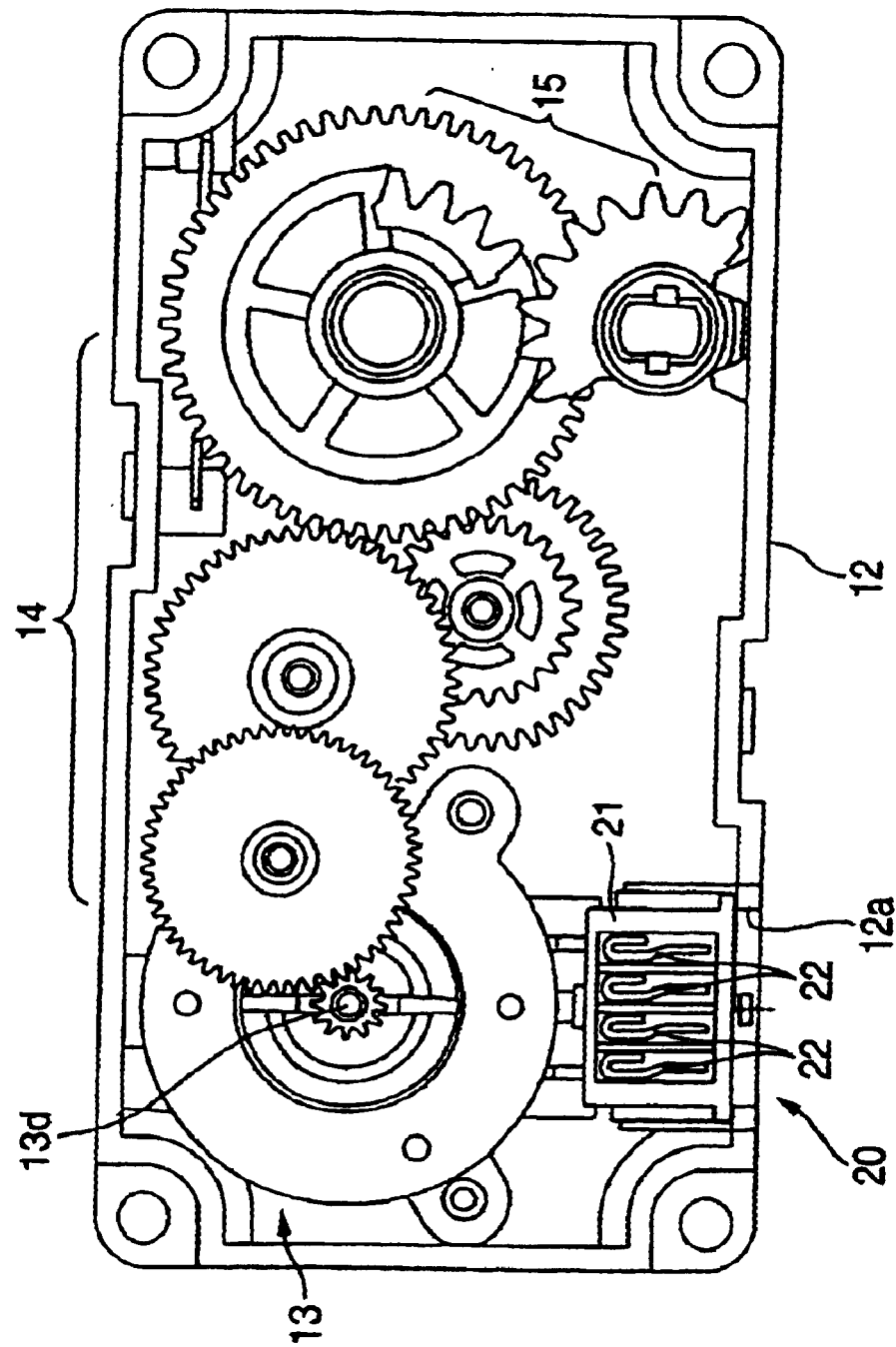
FIG. 2 is a plane view showing a state in which the motor connector shown in FIG. 1 is applied to a drive section of a motor-type damper of a refrigerator.
Figure 3:
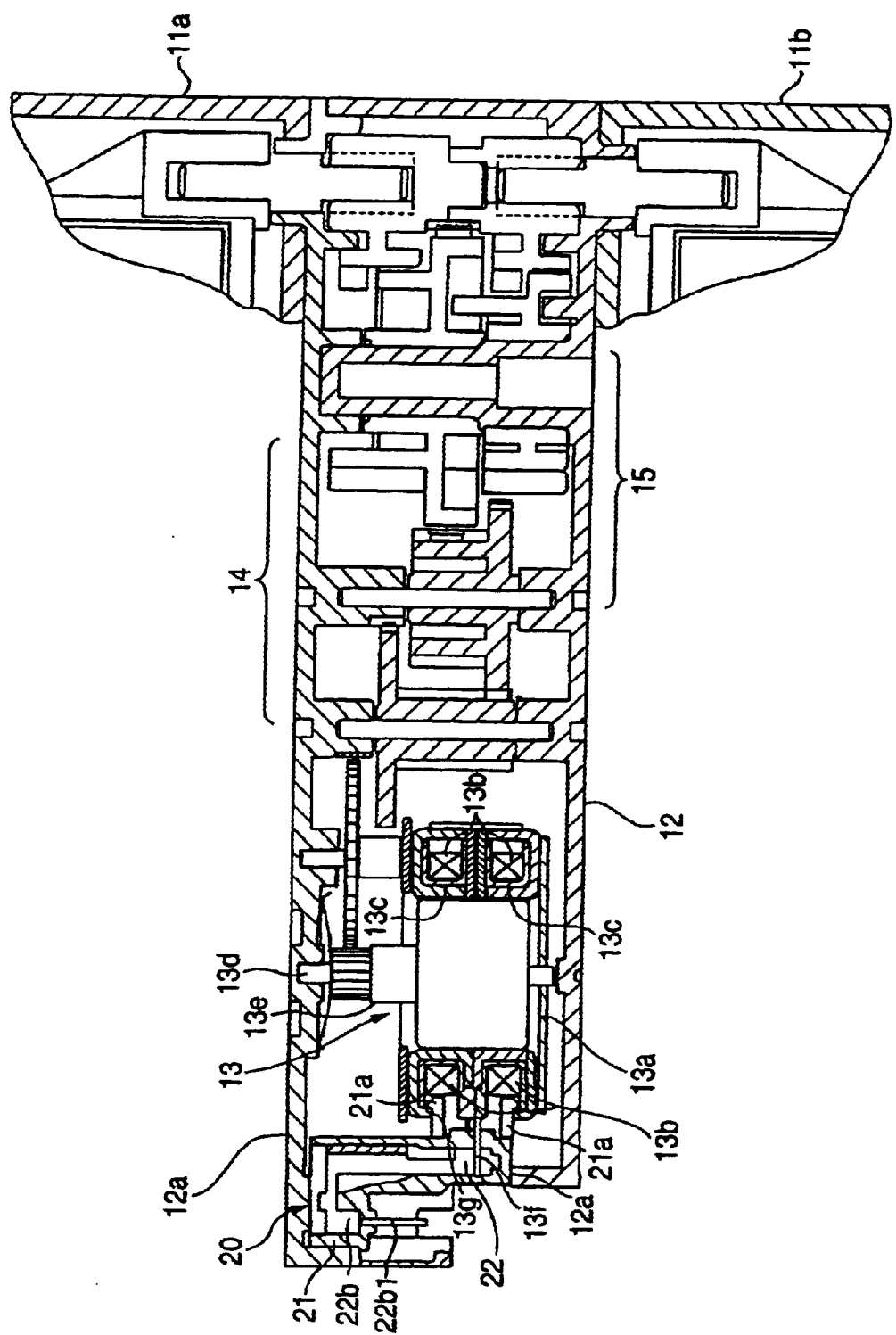
FIG. 3 is a longitudinal cross-sectional view of the drive section of the motor-type damper shown in FIG. 2.

The drive section shown in FIGS. 2 and 3 is for actuating two baffles 11a, 11b. The drive section primarily comprises a case body 12 made of resin; a stepping motor 13 which is fixedly disposed in the case body 12 and serves as a two-way rotatable drive source; a reduction gear train 14 for decelerating rotation of the stepping motor 13 and transmitting the rotation; and driving gears 15 which serve as members for transmitting rotation of the stepping motor 13 to the baffles 11a, 11b. A cover 12a is placed on an opening of the case body 12.

In the foregoing stepping motor 13, a pair of motor bobbins 13c, 13c, each having a drive coil (winding) 13b wound around its face, are provided in a motor case 13a assuming a substantially cylindrical shape. A rotor 13e which rotates integrally with a rotary shaft 13d is disposed inside the motor bobbins 13c, 13c.

Terminals of the drive coils (windings) 13b provided around the respective motor bobbins 13c are connected to and coiled around base portions of a plurality of coil terminals 13f which are provided so as to project radially outwards from an outer peripheral face of the motor case 13a. A motor connector 20 which is connected directly to the plurality of coil terminals 13f, as will be described later, is fitted to the motor case 13a. An external connector provided at the extremity of a wire extending from an unillustrated external controller is engaged with and connected to the motor connector 20.

The motor connector 20 has a rectangular holder 21 formed from resin. A plurality of connection members 22 formed from conductive material are arranged in the holder 21. The connection members 22 are embedded in the resin holder 21 by insert molding. An engagement leg 21a provided in the resin holder 21 is fitted to an edge of a lock section 13g which is formed so as to cut a portion of the motor case 13a. The resin holder 21 of the motor connector 20 attached so as to constitute a part of the motor case 13a is attached to an indentation 12a formed in a side wall face of the resin case body 12 constituting a drive section of the damper, by inserting in an axial direction of the motor.

Figure 1:
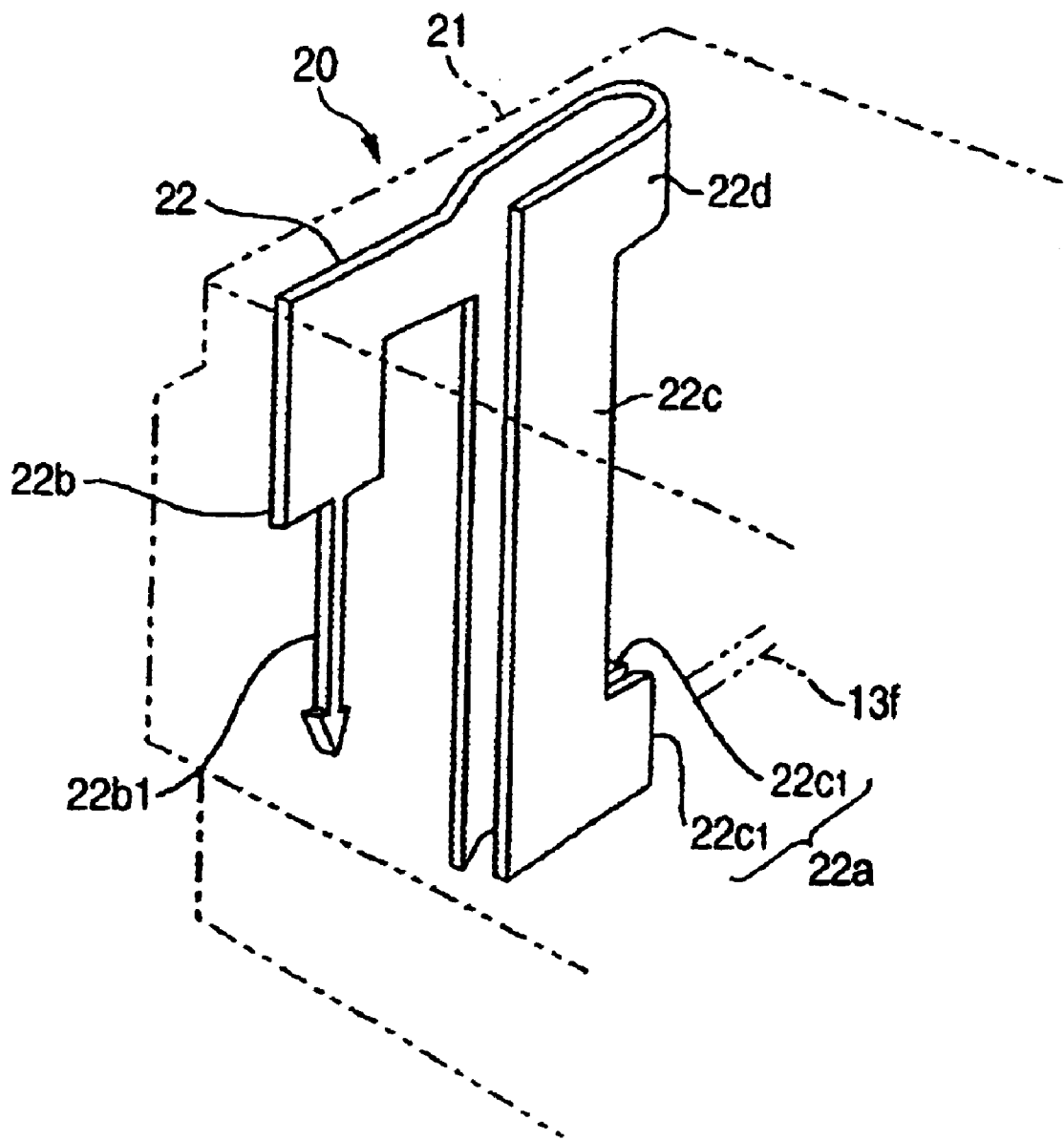
FIG. 1 is a fragmentary enlarged perspective view showing the structure of a motor connector according to one embodiment of the invention.

The connection members 22 provided in the motor connector 20 are formed particularly into a shape such as that shown in FIG. 1. A motor-side engagement section 22a into which the motor coil terminal 13f is to be inserted and fitted is formed on one end of each connection member 22 (i.e., a lower end shown in FIG. 1). An connector-side engagement section 22b, into which the previously-described external connector (not shown) is to be fitted, is formed on the other end of each connection member 22 (i.e., an upper end shown in FIG. 1).

More specifically, the connection member 22 has an elongated main body 22c extending in substantially parallel with the axial direction of the stepping motor 13. A motor-side engagement section 22a is provided at one end of the connection member 22 in the direction in which the main body 22c extends (i.e., the vertical direction in FIG. 1), and a connector-side engagement section 22b is provided at the other end of the connection member 22. The motor-side engagement section 22a and the connector-side engagement section 22b are spaced a predetermined distance apart from each other with respect to the direction of a motor shaft (i.e., the vertical direction in FIG. 1).

The connection member 22 is formed from a single conductive plate. In the conductive plate, a pair of main body pieces 22c are cantilevered by a connecting portion 22d. The connector-side engagement section 22b is cantilevered by one end of the connecting portion 22d. A free end of each main body piece 22c is formed with a piece 22c1 extending perpendicularly to the main body piece 22c.

In order to form the connection member 22 as shown in FIG. 1, the connecting portion 22d is so bent as to have a substantially U-shape. Accordingly, the main body pieces 22c (the pieces 22c1) are opposed to each other while defining a narrow gap therebetween. The gap defined by the pieces 22c1 serves as the motor-side engagement section 22a, so that the coil terminal 13f of the stepping motor 13 is inserted thereinto and elastically held therein. Since the main body pieces 22c has elasticity, the elastic holding property can be ensured at the motor-side engagement section 22a.

The connector-side engagement section 22b has a terminal section 22b1 which extends downwardly. The aforesaid external connector (not shown) is fitted to the terminal section 22b1. More specifically, the direction in which the external connector is to be removably attached to the connector-side engagement section 22b is set to a direction substantially perpendicular to the direction in which the coil terminal 13f is to be removably attached to the motor-side engagement section 22a (i.e., the horizontal direction).

According to the motor connector of the embodiment having such a construction, the coil terminal 13f of the motor bobbin 13b is connected directly to the motor-side engagement section 22a of the motor connector 20 without involvement of any other member. Hence, a simple and efficient connection operation is performed.

In the motor connector of the embodiment, the motor connector 20 is fitted to the lock section 13g of the motor case 13a, to thereby constitute a part of the motor case 13a. The motor connector 20 is handled efficiently integral with the motor.

In the motor connector of the embodiment, the direction in which the external connector is to be removably attached to the connector-side engagement section 22b of the motor connector 20 is set to a direction substantially perpendicular to the direction in which the coil terminal 13f is to be removably attached to the motor-side engagement section 22a of the motor connector 20. Hence, when the external connector is removed from or attached to the connector-side engagement section 22b, the load stemming from removal or attachment of the external connector is not exerted directly on a connection portion between the motor-side engagement section 22a and the coil terminal 13f.

In the motor connector of the embodiment, the connecting portion 22d extending perpendicularly to the main body pieces 22c to connect them is bent so as to have a substantially U-shape. The entire rigidity of the motor connector 20 is efficiently improved by the connection member 22 of small geometry. Hence, an attempt is made to miniaturize the motor connector.

In the motor connector of the embodiment, the motor-side engagement section 22a is readily formed by merely folding the connecting portion 22d. Hence, productivity of the motor connector 20 is improved.

In the motor connector of the embodiment, if the motor connector 20 is formed such that the connector is fitted to the stepping motor 13 so as to constitute a single unit, the operation required for attaching the motor connector 20 can be simplified or omitted.

Although the embodiment of the invention conceived by the inventor has been described specifically, the invention is not limited to the embodiment. Needless to say, the invention is susceptible to various modifications within the scope thereof.

Although the embodiment has described a case where the invention is applied to a damper of a refrigerator, the invention can also be applied to a variety of motor connectors other than the damper in the same manner.

What is claimed is:

1. A connector connected to a terminal of a coil wound on a motor bobbin in a motor, and coupled with a mating connector to electrically connect the motor and an external device, the connector comprising:
   an insulative holder; and
   at least one conductive connection member, accommodated in the holder, the connection member includes:
      a main body, extending in a first direction;
      a first engagement section, to which the terminal of the coil is inserted in a second direction which is different from the first direction, the first engagement section monolithically formed on a first end portion of the main body to hold the terminal of the coil; and
      a second engagement section, monolithically formed on a second end portion of the main body to be coupled with the mating connector.

2. The connector as set forth in claim 1, wherein:
   the second direction is perpendicular to the first direction.

3. The connector as set forth in claim 1, wherein:
   the connection member is formed from a single conductive plate including a pair of main body pieces extended from a connecting portion in a cantilevered manner to form the main body;
   the second engagement section is extended from one end portion of the connecting portion; and
   the connection member is formed by folding the connecting portion such that the main body pieces are opposed with each other while defining a gap therebetween.

4. The connector as set forth in claim 3, wherein:
   an engagement piece is extended from a free end portion of each main body piece in a direction perpendicular to a direction in which the main body piece extends;
   the engagement pieces are opposed with each other when the connecting portion is folded to define a gap therebetween; and
   the terminal of the coil is inserted into the gap between the engagement pieces so that the engagement pieces serve as the first engagement section.

5. The connector as set forth in claim 1, wherein the first engagement section elastically holds the terminal of the coil.

6. The connector as set forth in claim 1, wherein the first direction is parallel with a rotary shaft of the motor.

7. The connector as set forth in claim 1, wherein the mating connector is attached to the second engagement section in a third direction which is different from the second direction.

8. The connector as set forth in claim 7, wherein the third direction is parallel with the first direction.

9. The connector as set forth in claim 8, wherein the first direction and the third direction are parallel with a rotary shaft of the motor.

10. A motor, comprising:
    a casing body;
    a motor bobbin accommodated in the casing body;
    a coil wound on the motor bobbin;
    a connector provided with at least one conductive connection member including:
       a main body, extending in a first direction;
       a first engagement section, to which the terminal of the coil is inserted in a second direction which is different from the first direction, the first engagement section monolithically formed on a first end portion of the main body to hold the terminal of the coil; and
       a second engagement section, monolithically formed on a second end portion of the main body to be coupled with a mating connector to which an external device is connected.

11. The motor as set forth in claim 10, wherein:
    the connector includes an insulative holder for accommodating the connection member therein; and
    the holder is integrally fitted with the casing body to form a part of the casing body.

12. The motor as set forth in claim 10, further comprising a rotary shaft, wherein
    the first direction is parallel with the rotary shaft.

13. The motor as set forth in claim 10, wherein the first engagement section elastically holds the terminal of the coil.

14. The motor as set forth in claim 10, wherein the second direction is perpendicular to the first direction.

15. The motor as set forth in claim 10, wherein the mating connector is attached to the second engagement section in a third direction which is different from the second direction.

16. The motor as set forth in claim 15, wherein the third direction is parallel with the first direction.

17. The motor as set forth in claim 16, wherein the first direction and the second direction are parallel with the rotary shaft.

* * * * *